United States Patent [19]

Wadhawan et al.

[11] Patent Number: 5,715,287
[45] Date of Patent: Feb. 3, 1998

[54] METHOD AND APPARATUS FOR DUAL PURPOSE TWISTED PAIR INTERFACE CIRCUIT FOR MULTIPLE SPEED MEDIA IN A NETWORK

[75] Inventors: Ruchi Wadhawan, Sunnyvale; Craig Owens, Belmont, both of Calif.

[73] Assignee: 3Com Corporation, Santa Clara, Calif.

[21] Appl. No.: 544,745

[22] Filed: Oct. 18, 1995

[51] Int. Cl.$^6$ .................................................. H04L 23/00
[52] U.S. Cl. .................... 375/377; 375/257; 333/124; 370/466
[58] Field of Search .......................... 375/257, 258, 375/357, 377; 330/252; 333/124; 370/465, 466

[56] References Cited

U.S. PATENT DOCUMENTS

| | | |
|---|---|---|
| 5,249,183 | 9/1993 | Wong et al. ............................ 370/85.3 |
| 5,260,664 | 11/1993 | Graham ................................... 375/224 |
| 5,541,957 | 7/1996 | Lau ........................................ 375/258 |

*Primary Examiner*—Tesfaldet Bocure
*Assistant Examiner*—Bryan Webster
*Attorney, Agent, or Firm*—Townsend and Townsend and Crew LLP

[57] ABSTRACT

A method and apparatus is provided allowing a dual-speed network adapter to connect to the same physical connector without the use of mechanical or electro-mechanical switches. On the transmit path, the invention uses a differential amplifier buffer (130) to selectively couple a high speed transmit paths to the network, with the differential amplifier connected to the same output impedance as one of the two driver circuits. On the receive path, the invention allows data to be received in parallel by two receiver circuits, with one circuit isolated from the other with a pair of very high input impedance emitter/followers (40, 50).

27 Claims, 2 Drawing Sheets

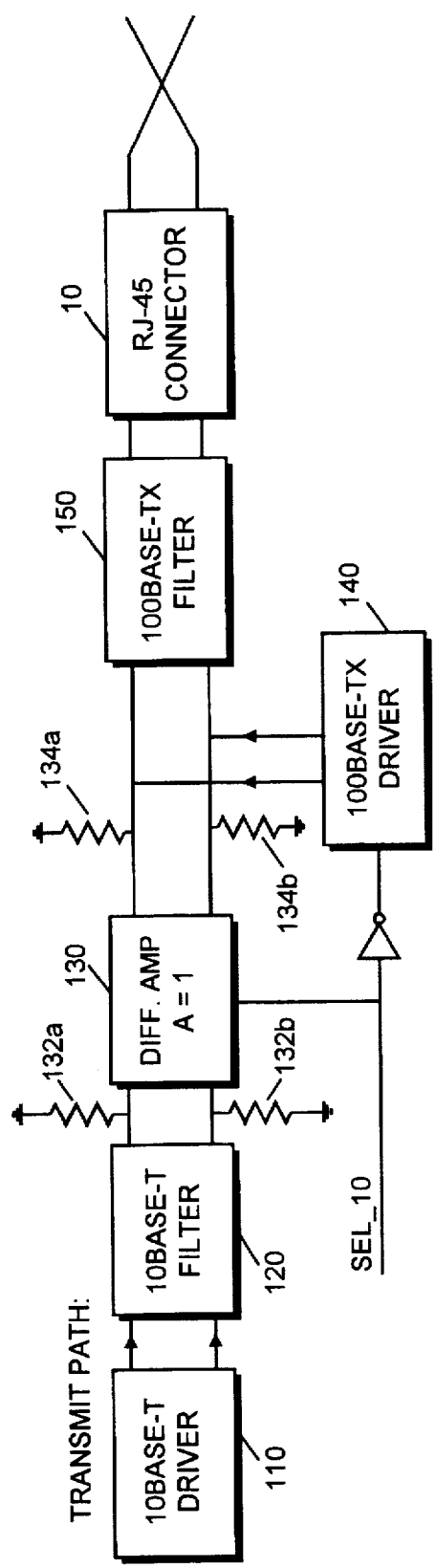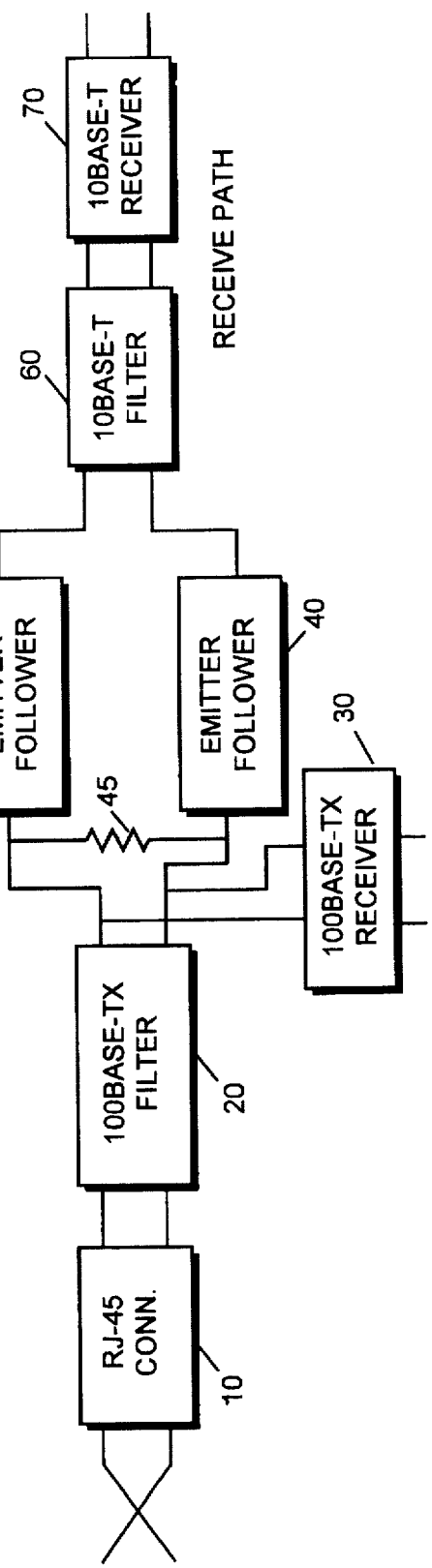
FIG. 2
FIG. 1

METHOD AND APPARATUS FOR DUAL PURPOSE TWISTED PAIR INTERFACE CIRCUIT FOR MULTIPLE SPEED MEDIA IN A NETWORK

BACKGROUND OF THE INVENTION

The present invention relates generally to transmission of data signals over a transmission line. More particularly, the present invention relates to a method and circuit for selectively coupling dual-speed data transmission and reception circuits to a single physical network connector connectable to a transmission line.

Local Area Networks are becoming increasingly common at the office and in industry, where networking enhances productivity by providing improved sharing of information and specialized equipment. Such networks typically consist of a number of different computer resources including a number of Personal Computers as client hosts through which individuals may access a network server and specialized equipment. Each host within the network requires an interface apparatus commonly known as an adapter that performs a role intermediate of the host and network for the reception, buffering and transmission of data by the host. The adapter generally consists of specialized data encoding, transmission, reception, and buffering circuits as well as a connector for physically connecting to a network. An adapter may be a standard ISA (Industry Standard Architecture) bus card or other bus card, or a PCMCIA card, or it may be integrated onto the mother board of a PC, portable computer, or other device.

In response to a felt need for a widely adopted standard for interoffice communication, several industry groups and the IEEE adopted IEEE Standard 802.3 (Ethernet) for data transmission over unshielded twisted-pair at speeds up to 10 million bits per second (10 Mbps). The 802.3 standard has been widely used, resulting in a large installed base of hardware capable of transmitting 10 Mbps signals in office computer environments over UTP wiring rated Category 3 by the Electronic Industries Association. Category 3 wiring is capable of carrying signals with spectral content up to approximately 30 MHz. At higher frequencies, there is too much signal distortion in Category 3 wiring and there is too much signal leakage from the wires. One 10 Mbps Ethernet standard using Category 3 UTP is also referred to as 10Base-T Ethernet.

Ever increasing advances in computer technology as well as a desire to transmit graphics, video and other high bandwidth data over office computer networks have created a need for higher speed data transmission. Responding to this need, the IEEE in 1992 began to develop a set of standards for a local area network capable of transmitting data at 100 Mbps. One such standard that has developed is the 100Base-TX standard, referred to as IEEE 802.3 100 Base-TX for Ethernet transmission at 100 Mbps. The 100Base-TX standard transmits signals at a higher frequency over UTP wiring rated Category 5 by the Electronic Industries Association. Category 5 wiring is capable of carrying signals at frequencies much higher than Category 3 wiring. The 100Base-TX standard specifies different electrical characteristics than the 10Base-T standard.

Presently, users of Ethernet and manufacturers of Ethernet products are in a transition phase between 10Base-T and 100Base-TX. New network installations are generally with Category 5 UTP wiring and hardware and other equipment that can support the 100Base-TX standard, but there remains a large installed base of Category 3 wiring not capable of operating at the 100 Mbps speed. Computer owners purchasing adapters would like the flexibility of operating on the old standard if that is the network available to them, but of operating on the new standard when their network is updated or when their computer is connected to a new network. Manufacturers of adapter cards have responded by providing dual-speed adapter cards. These dual-speed cards are capable of operating on either the 10Base-T or 100Base-TX standard. The present invention provides an improved dual-speed adapter.

A major design obstacle in these dual-speed cards is how to combine the two signal paths for the 10Base-T and 100Base-TX standards. A major obstacle to combining them is the need for impedance matching. The two standards have a number of different electrical characteristics including: (1) 100 Base-TX data on the line is ternary (MLT-3) with a peak to peak differential amplitude of approximately 2 V, while 10 Base-T data is binary with a peak to peak differential amplitude of approximately 5 V; and (2) 100 Base-TX data has a spectral content approximately $\leq 160$ MHz, while 10 Base-T data has spectral content $\leq 30$ MHz.

One solution that has been employed in prior art dual-speed adapters is not to combine the signal paths at all, but to instead provide two separate physical connectors (such as two RJ-45 jacks) on the adapter, with one connector for 10Base-T and the other for 100Base-TX. This solution has a number of disadvantages. First, the physical connectors are costly both financially and in terms of space on the adapter. Secondly, the jacks are identical in size, so users are required to know what the speed of the network they are connecting to is and are required to be careful about which jack they connect to the network line. Users can easily mistakenly insert the network plug into the wrong connector resulting in inoperability of the network.

Another solution that has been employed is to use only one physical connector but to use an electro-mechanical switch or relay to switch between 10Base-T and 100Base-TX transceivers. The disadvantages to this solution are again higher costs and the higher failure rate of adapters that include an electro-mechanical switching component.

A third solution that has been employed is to use user settable switches or jumpers. Again, this has the disadvantage of requiring user intervention and being prone to user error.

What is needed is a method and circuit capable of connecting 10Base-T and 100Base-TX transceiver circuits to the same physical connector that does not require user intervention and does not incorporate movable switches subject to failure.

SUMMARY OF THE INVENTION

According to the present invention, a dual-speed adaptor is provided with a circuit allowing two different speed signal transmit paths to be selectively connected to the same physical connector without the use of electro-mechanical relays or user settable switches or jumpers. Transmit switching is accomplished according to the invention by means of a tristateable differential amplifier buffer with a gain of one and a tristateable 100 Mbps driver. According to the invention, the receive data paths are connected in parallel via a pair of emitter-followers such that received signals are detected simultaneous by the 10Base-T and 100Base-TX networks.

The invention will be understood more completely upon reference to the following detailed description in connection with the accompanying drawings.

BRIEF DESCRIPTION OF THE DRAWINGS

FIG. 1 is a block diagram of a dual-speed data reception circuit according to the invention.

FIG. 2 is a block diagram of a dual-speed data transmission circuit according to the invention.

DETAILED DESCRIPTION OF SPECIFIC EMBODIMENTS

Figure 3:
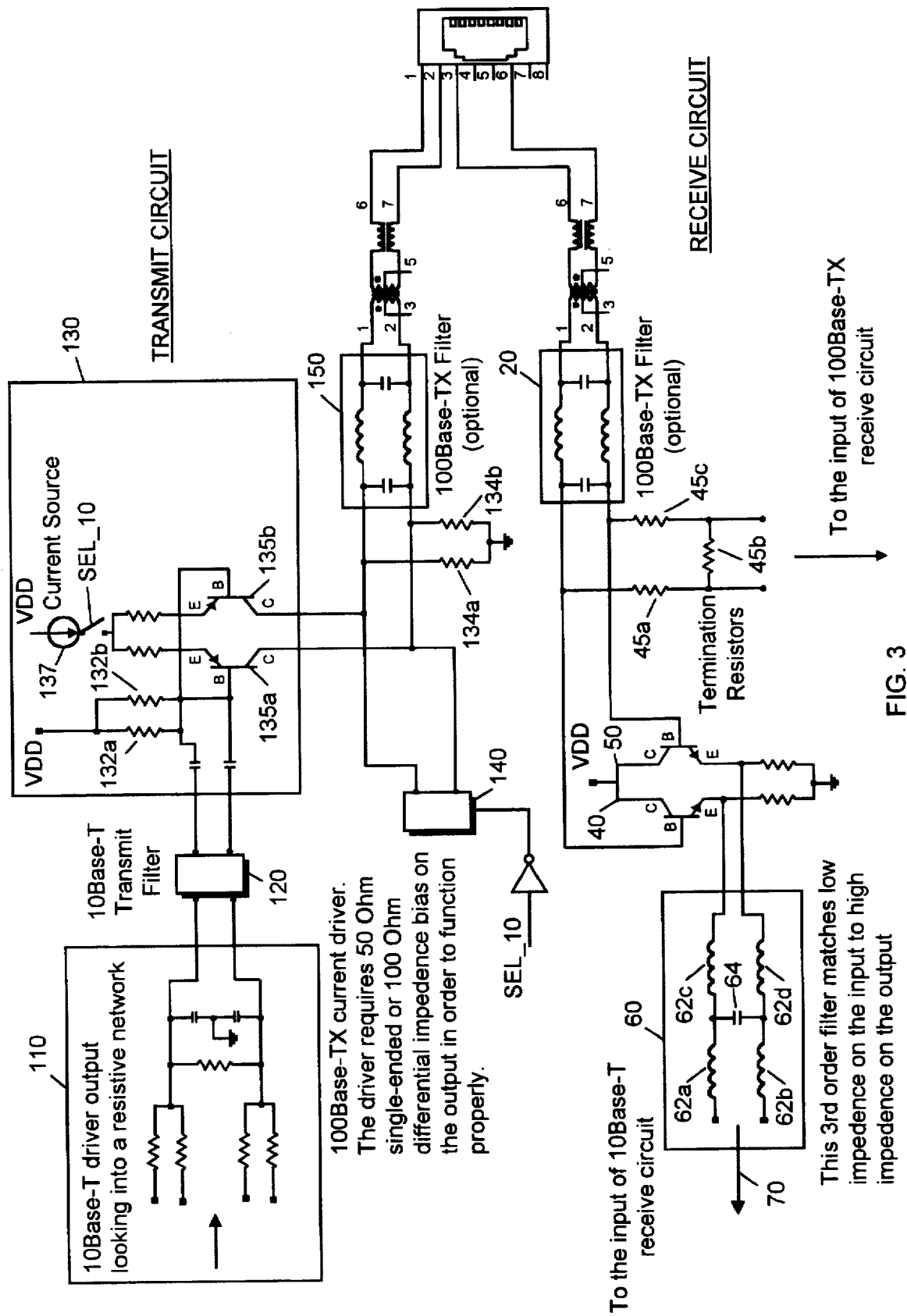
FIG. 3 is a schematic of a dual-speed data reception and a dual-speed data transmission circuit connected to a single connection according to the invention.

In the following description numerous specific details are set forth, such as specific frequency values, data transmission speeds, network standards, etc., in order to provide a thorough understanding of the present invention. However, it will be apparent to one skilled in the art that the present invention may be practiced while varying many of these specific details. It is therefore intended that the invention only be limited by the attached claims. In other instances, well-known circuits and devices are shown in block diagram form in order not to obscure unnecessarily the present invention.

FIG. 1 is a block diagram of a dual-speed data reception circuit according to a specific embodiment of the invention. According to the invention, both the 10Base-T and the 100Base-TX circuits sense all incoming signals on RJ-45 connector 10 and no switching is required on the receive path.

Connector 10 receives a signal from the network and transmits it to 100Base-TX filter 20. Filter 20 is a low-pass 1:1 impedance filter that filters out noise frequencies above the 100Base-TX signal spectral content of ≦160 MHz and has essentially no effect on frequencies near the 10Base-T spectral content ≦30 MHz. The outputs of filter 20 are connected together across a 100Ω resistance 45, which provides a matching impedance to the network transmission line impedance of 100Ω. The voltage that develops across resistor 45 is sampled by both a 100Base-TX receiver 30 and a pair of emitter-followers 40 and 50. Emitter-followers 40 and 50 present very high input impedance, effectively isolating their outputs from the input seen by receiver 30. The invention uses emitter-followers 40 and 50 to isolate the 10Base-T circuit from the 100Base-TX circuit. According to this aspect of the invention, the 10Base-T filter 60 and receiver 70 are essentially invisible to the 100Base-TX receiver 30. Emitter-followers 40 and 50 also have a very low output impedance. Therefore, the invention incorporates a special 10Base-T filter 60 that is designed to receive a very low input impedance but have a high output impedance. Filter 60 is not a matching one-to-one impedance filter. From filter 60, the signal goes to 10Base-T receiver 70, essentially in parallel with it being received at 100Base-TX receiver 30. 100Base-TX receiver 30 and 10Base-T receiver 70 decode their appropriate received frequency signals in parallel and make the digital data available to the digital circuitry on the adapter. The adapter or its host computer may contain further circuitry or software to examine the two incoming data streams and determine which contains valid data. In this way, an adaptor according to the invention may "autosense" whether it has been connected to a 10Base-T or 100Base-TX network.

FIG. 2 is a block diagram of a dual speed data transmission circuit according to the invention. During 10 Mbps operation, 10Base-T Driver 110 outputs a data signal to a filter 120. (In a single speed adaptor, the output signal of filter 120 would then be transmitted on the network through connector 10.) In a specific embodiment, filter 120 has a cutoff of 17 MHz, which makes it difficult to design a combined 10Base-T/100Base-TX transmit circuit because filter 120 will block most of the 100Base-TX carrier frequency. However, filter 120 is necessary to conform the invention operation to the 10Base-T specification and for impedance matching to the network cable, which has an impedance of 100Ω. In one specific embodiment, filter 120 has an input and output impedance of 100Ω. Other embodiments are possible in which filter 120 has a different input and output impedance. According to the invention, the output of filter 120 is connected to a differential amplifier (DA) buffer 130. DA 130 is selectively controlled by the signal *SEL__10, which when in the active state turns on DA 130. When *SEL__10 is in the inactive state, DA 130 is put into a high impedance state at its outputs and effectively removes driver 110 and filter 120 from the circuit. The state of *SEL__10 may be determined based on the hosthost's autosense of the network's speed. The input impedances of DA 130 are each 50Ω as indicated by resistors 132a and 132b, therefore the combined impedance seen by filter 120's output is 100Ω, which is the same impedance that filter 120 would see if it were transmitting directly onto a network UTP line. This is one important aspect of the invention. The output of DA 130 is connected to 100Base-TX Filter 150. During 10 Mbps operation, 100Base-TX Filter 150 does not affect the signal from DA 130 because the cutoff frequency of filter 150 is much higher than the frequency output by DA 130. The signal from 100Base-TX Filter 150 is then connected to RJ-45 connector 10 which is available for connection to a network.

During 100 Mbps operation, the outputs of DA 130 are put in a tri-state high impedance condition by signal *SEL__ 10 so that DA 130, filter 120 and driver 110 are disconnected from the 100 Mbps operation of the circuit. Signal *SEL__10 turns on 100Base-TX driver 140. A key element in the correct dual-speed operation of the invention is the fact that according to the invention the output impedances 134a and 134b on DA 130 are physically the same as the output impedance on 100Base-TX driver 140.

For proper operation of the circuits as shown, filter 120 requires a 100Ω input impedance as well as a 100Ω output impedance. Therefore driver 110 would also have 100Ω impedance. Equivalent designs are possible where filter 120 has a different value for its input and output impedance. An important aspect is that the same resistances are seen at the output of DA 130 as are seen at the output of the 100Base-TX driver 150 while DA 130 isolates the 10Base-T driver from the 100Base-TX driver. DA 130 will not degrade the signal because it has a gain of one and transfers from one 100Ω impedance to another 100Ω impedance (or, in alternative designs, between two impedances of different values).

FIG. 3 is a schematic diagram showing a single connector 10 connected to a receive circuit and a transmit circuit according to the invention. FIG. 3 illustrates additional circuit details of various circuit elements, including differential amplifier (DA) 130. DA 130 operates as a conventional DA with a unity gain and is constructed of a current source 137, and transistors 135a and 135b. DA input impedances 132a and 132b are also shown in FIG. 3. 10 Mbps filter 60 is shown as a CL filter with a very low impedance but a high output impedance and is constructed from inductances 62a–d and capacitance 64.

While the above is a complete description of specific embodiments of the invention, various modifications, alternative constructions, and equivalents may be used. For example, while the circuits shown assume PNP implementation, the same functionality may be achieved using NPN transistors and reversing to polarity of all signals. Therefore, the above description should not be taken as limiting the scope of the invention as defined by the claims.

What is claimed is:

1. An apparatus for transmitting data over a transmission connection at a selected one of at least a lower frequency and a higher frequency comprising:

a first filter with a pass frequency at said higher frequency operatively coupled to said transmission connection, said filter not interfering with transmission at said lower frequency;

a first driver for signals at said higher frequency, said driver having outputs operatively coupled to said first filter and to a first pair of impedances for matching transmission line impedance;

a differential amplifier having outputs operatively coupled to said first filter and to said first pair of impedances for matching transmission line impedance and having inputs operatively coupled to a second filter with a pass frequency at said lower frequency and to a second pair of impedances for matching transmission line impedance;

a second driver for signals at said lower frequency, said driver having outputs operatively coupled to said second filter; and a select signal for selectively turning on either said differential amplifier or said first driver and for placing the other of said differential amplifier or said first driver in a high output impedance state.

2. The apparatus according to claim 1 wherein said differential amplifier has a gain of essentially unity.

3. The apparatus according to claim 1 wherein said higher frequency is a carrier frequency for a 100 Mbps ethernet data signal.

4. The apparatus according to claim 1 wherein said lower frequency is a carrier frequency for a 10 Mbps ethernet data signal.

5. The apparatus according to claim 1 wherein said first pair of impedances are two resistors which are physically shared by said first driver and said differential amplifier.

6. The apparatus according to claim 1 wherein said differential amplifier is a tristateable differential amplifier buffer with a gain of approximately unity selectively controlled by a select signal.

7. A circuit for selectable dual-speed transmission of data over a single transmission connection comprising:

a first filter with a pass frequency at a carrier frequency of a 100 Mbps ethernet data signal operatively coupled to said single transmission connection, said filter not interfering with transmissions through it at a carrier frequency for 10 Mbps ethernet;

a 100 Mbps driver having outputs operatively coupled to said first filter and to a first pair of resistors for matching transmission line impedance;

a differential amplifier with an essentially unity gain having outputs operatively coupled to said first filter and to said first pair of resistors and having inputs operatively coupled to a 10 Mbps filter and to a second pair of resistors for matching transmission line impedance;

a 10 Mbps driver having outputs operatively coupled to said 10 Mbps filter; and a select signal for selectively turning on either said differential amplifier or said 100 Mbps driver and for placing the other of said differential amplifier or said 100 Mbps driver in a high output impedance state.

8. An apparatus for receiving data over a connection at one of at least a lower frequency or a higher frequency comprising:

a first filter with a pass frequency at said higher frequency operatively coupled to said connection, said filter not interfering with reception at said lower frequency;

an impedance coupled between the outputs of said first filter;

a first receiver coupled to said impedance for receiving signals at said higher frequency; and a pair of emitter followers with inputs coupled to said impedance and outputs coupled to;

a second filter with a pass frequency at said lower frequency operatively coupled to;

a second receiver for receiving signals at said lower frequency.

9. The apparatus according to claim 8 wherein said filter has a low input impedance and a high output impedance.

10. The apparatus according to claim 8 wherein said higher frequency is a carrier frequency for a 100 Mbps ethernet data signal.

11. The apparatus according to claim 8 wherein said lower frequency is a carrier frequency for a 10 Mbps ethernet data signal.

12. The apparatus according to claim 8 wherein said impedance is a resistor approximately equal to said line impedance placed between said two transmission lines.

13. The apparatus according to claim 8 wherein said emitter followers present a high input impedance effectively isolating their outputs from the input of said first receiver.

14. A circuit for dual-speed reception of data over a single transmission connection comprising:

a first filter with a pass frequency at a carrier frequency of a 100 Mbps ethernet data signal operatively coupled to said single transmission connection, said filter not interfering with receptions through it at a carrier frequency for 10 Mbps ethernet;

a first filter with a pass frequency at said higher frequency operatively coupled to said connection, said filter not interfering with reception at said lower frequency;

an impedance coupled between the outputs of said first filter;

a 100 Mbps receiver having inputs operatively coupled to said impedance; and a pair of emitter followers with inputs coupled to said impedance and outputs coupled to;

a 10 Mbps filter operatively coupled to;

a 10 Mbps receiver for receiving signals at said lower frequency.

15. A dual-speed bus adapter comprising:

a single physical connection to a transmission channel;

a receive circuit coupled to said physical connection comprising:

a higher speed filter coupled at one end to said physical connection and at the other end to a higher speed receiver and an impedance;

a pair of emitter followers coupled to said impedance;

a lower speed filter coupled at one end to said impedance and at the other end to a lower speed receiver; and a transmit circuit coupled to said physical connection comprising:

a higher speed filter coupled at one end to said physical connection and at the other end to a higher speed driver and a first pair of impedances;

a differential amplifier having outputs operatively coupled to said higher speed filter and to said first pair of impedances and having inputs operatively coupled to a lower speed filter and to a second pair of impedances;

a lower speed driver for signals at said lower frequency, said lower speed driver having outputs operatively coupled to said lower speed filter; and a select signal for selectively turning on either said differential amplifier or said higher speed driver and for placing the other of said differential amplifier or said higher speed driver in a high output impedance state.

16. A method for selective transmitting data at one of at least a lower frequency or a higher frequency over a transmission line comprising:

driving the inputs of a tristateable differential amplifier with a signal at said lower frequency;

connecting the outputs of said tristateable differential amplifier to a pair of impedances matching said transmission line, said pair of impedances operatively connected to said transmission line;

selectively driving said pair of impedances with a signal at said higher frequency; and enabling either said tristateable differential amplifier or said signal at said higher frequency.

17. The method according to claim 16 wherein said differential amplifier has a gain of essentially unity.

18. The method according to claim 16 wherein said differential amplifier has a gain of essentially unity and a high output impedance.

19. The method according to claim 16 wherein said higher frequency is a carrier frequency for a 100 Mbps ethernet data signal.

20. The method according to claim 16 wherein said lower frequency is a carrier frequency for a 10 Mbps ethernet data signal.

21. The method according to claim 16 wherein said differential amplifier is a tristateable differential amplifier buffer with a gain of approximately unity selectively controlled by a select signal.

22. A method for operationally connecting a first driver operating at a higher transmission frequency and a second drivers operating at a lower transmission frequency to a single transmission line connector comprising:

filtering the output of said second driver through a low-pass filter, the outputs of said low-pass filter connected to a pair of resistances for matching transmission line impedance;

connecting the outputs of said low-pass filter to a differential amplifier having an essentially unity gain, said differential amplifier being selectable to have its outputs placed in a high-impedance state, said differential amplifier outputs being connected to a second pair of resistances;

selectively driving the outputs of said differential amplifier with a signal at said higher frequency;

driving said second pair of resistances with either said differential amplifier or said signal at said higher frequency;

operatively connecting said second pair of resistances to said single transmission line connector.

23. The method according to claim 22 further comprising placing a filter between said second pair of resistances and said single transmission line connector.

24. The method according to claim 22 wherein said higher frequency is a carrier frequency for a 100 Mbps ethernet data signal.

25. The method according to claim 22 wherein said lower frequency is a carrier frequency for a 10 Mbps ethernet data signal.

26. A method for dual-speed reception of data over a single transmission connection comprising:

simultaneously receiving a signal from said single transmission connection at a first receiver capable of receiving data at a first carrier frequency and at the inputs of a pair of emitter/followers said emitter/followers having their inputs connected by an impedance to match a line impedance of a transmission line;

connecting the outputs of said pair of emitter/followers to a second receiver capable of receiving data at a second carrier frequency; and where said first carrier frequency is substantially larger than said second carrier frequency;

decoding data received at said first receiver and said second receiver to sense the actual frequency of data being received on the single transmission connection.

27. A method for transmitting and receiving data at one of two different data transmission speeds over a single connector on a network adaptor comprising:

driving a pair of impedance resistances with a first output data signal, said first output data signal supplied by the outputs of a differential amplifier, said differential amplifier responding to a select signal by placing its outputs in a high impedance state, effectively isolating said pair of impedance resistances from said first output data signal;

driving said pair of impedance resistances with a second output data signal, said output data signal disabled by the inverse of said select signal;

operationally connecting said pair of impedance resistances to the output lines of said single connector; supplied by the outputs of a differential amplifier, said differential amplifier responding to a select signal by placing its outputs in a high impedance state, effectively isolating said pair of impedance resistances from said first output data signal;

connecting the input lines of said single connector to the input of said second receiver circuit and to a pair of emitter followers;

connecting the outputs of said emitter followers to the inputs of said first receiver circuit;

simultaneous receiving a data signal at said first receiver and said second receiver; and decoding data received at said first receiver and said second receiver to sense a data transmission speed.

* * * * *